United States Patent [19]
Hyder et al.

[11] Patent Number: 6,081,846
[45] Date of Patent: Jun. 27, 2000

[54] METHOD AND COMPUTER PROGRAM PRODUCT FOR REDUCING INTRA-SYSTEM DATA COPYING DURING NETWORK PACKET PROCESSING

[75] Inventors: Jameel Hyder, Redmond; Kyle Brandon, Seattle; Nk Srinivas; Rod Gamache, both of Issaquah, all of Wash.

[73] Assignee: Microsoft Corporation, Redmond, Wash.

[21] Appl. No.: 08/852,888

[22] Filed: May 8, 1997

[51] Int. Cl.$^7$ ............................ G06F 13/00; G06F 13/38
[52] U.S. Cl. ............................ 709/250; 709/5; 709/321; 710/52; 710/56
[58] Field of Search ............................ 395/681; 709/301; 710/250, 52, 56

[56] References Cited

U.S. PATENT DOCUMENTS

| | | | |
|---|---|---|---|
| 5,673,394 | 9/1997 | Fenwick et al. | 709/302 |
| 5,745,790 | 4/1998 | Oskouy | 709/213 |
| 5,778,180 | 7/1998 | Gentry et al. | 709/212 |
| 5,852,719 | 12/1998 | Fishler et al. | 709/216 |
| 5,898,841 | 4/1999 | Higgins | 709/236 |
| 5,920,703 | 7/1999 | Campbell et al. | 709/236 |

OTHER PUBLICATIONS

Michael W. Garwood, et al, *Unix Streams: If Modularity and Portability Are Part of Your Unix Problems*, Dr. Dobb's Journal of Software Tools, vol. 14; No. 1; p. 50 (Jan. 1989).
Brian Ramsey, *Streamlining Protocols for Networks*, Electronic Engineering Times, Embedded Systems, p. 80, part 3:networks (Jun. 5, 1995).
Tom Williams, *Unix–Style Communications for Embedded Systems: Metasphere's Embedded Streams Software; Product Announcement*, Computer Design, vol. 31; No. 10; p. 140 (Oct. 1992).
Michael Day, *Unix Breakthroughs Create LAN Products*, LAN Times, vol. 8; No. 3; p. 69 (Feb. 4, 1991).
Jim Carr, *for Unix Users: NSF and RSF Provide File Access Across Networks; Unix Local Area Networks; Network File System, Remote File Sharing; Includes Related Article on Sun's Guide to Who Is Selling OCN/NFS*, The Local Area Network Magazine, vol. 5; No. 2; p. 76 (Feb. 1990).
Eric Hindin, *Unix System V Version with Interface Between Applications and Networks Has Users Talking; Computer Network Protocols; Connectivity*, PC Week, vol. 4; p. C11 (Jan. 27, 1987).

Ahlgren, B.; Bjorkman, M.; Moldeklev, K.; *The Performance of A No–Copy API for Communication*, found in Architecture and Implementation of High Performance Communication Subsystems, 1995, pp. 173–176.

*Primary Examiner*—Dung C. Dinh
*Attorney, Agent, or Firm*—Workman, Nydegger & Seeley

[57] ABSTRACT

A method and computer program product that overcomes the problem of intrasystem copying of data from one data structure to another while processing incoming packets of network data coming into the system off a communications network in an environment having an integrating component in between the network card device driver and the transport protocol driver that assigns system memory for packets to the respective drivers. The integrating component temporarily transfers ownership of the original data structure from the network card device driver to the transport protocol driver based on indication from the network card device driver, independent determination that the network card device driver can afford to temporarily release ownership, and determination of the transport protocol driver's ability to take ownership. The transport protocol driver will indicate receipt of ownership of the data structure and later explicitly release it. The transport protocol driver may then operate on the data structure after the initial invocation session has ended when it initially received ownership until it is released at a later time to thus prevent copying of the data and thereby increase system efficiency. Temporary transfer of ownership according to the present invention is especially important when the network card device driver fills data structure with network data during interrupt processing that causes a scenario where the transport protocol driver is not able to fully process the network data in the initial invocation session without copying the data.

30 Claims, 6 Drawing Sheets

METHOD AND COMPUTER PROGRAM PRODUCT FOR REDUCING INTRA-SYSTEM DATA COPYING DURING NETWORK PACKET PROCESSING

BACKGROUND OF THE INVENTION

1. The Field of the Invention

The field of the invention generally is network packet processing on a general purpose computer system. More particularly, the field of the invention relates to a personal computer connected to a communications network and having a layered architecture for handling packets of network data that roughly corresponds to the lower layers of the ISO model. Specifically, the invention relates to methods of increasing system processing efficiency by reducing the amount of copying that occurs between different layers of software during network packet processing.

2. Present State of the Art

The effectiveness of general purpose stand alone computers, such as the personal computer found in most office environments and laptop computers increasingly used by professionals requiring portability, has been substantially improved by allowing communications between machines over a communications network. Such networking of computers allows the sharing of resources found on one computer with other computers in the network. For example, storage areas having files, printers, modems, and other resources may all be advantageously shared.

Data that is shared between computers is sent in packets across the physical network connection and read by destination computers. Such packetized network data may be requests for shared resources, data, such as a file, or other information that must be communicated from one computer to the other. As used herein, the term "network data" refers to data or information that is actually transmitted over the communications network between different computers.

On a particular computer or node of the network, a network interface card (NIC) or network card monitors the physical communications channel for packets destined for that computer as well as transmits packets of network data destined for other computers. Software components run on the node computer under direction or control of the operating system or architecture for managing and controlling the network card operations. Furthermore, other software components exist to further abstract the network communications channel and provide more and more general networking interfaces for higher layers using their services. The layered approach allows compartmentalization and easier development of network applications.

One model used to provide a structure for layered software component development is the seven-layer ISO model that is well known in the art. While actual implementations of the ISO model do not necessarily rigidly isolate each particular layer as a separate component exposing it's own interface to layers above and below, the concepts of the model are generally applicable. With respect to the present invention as currently embodied, the lower layers of the ISO model are at issue, namely, the data link layer implemented by a network card device driver, and the transport and network layers implemented as a transport protocol driver.

Lower level networking functions, such as are discussed throughout this application with respect to controlling a network card and initial processing of packetized network data, are handled by special system software components called drivers that integrate with a host operating system according to a specific architecture and have special privileges for accessing system resources. Throughout this application, reference will be made to the Windows NT® operating system available from Microsoft Corporation and to its specific architecture wherein lies one embodiment of the present invention. Such drivers run in "kernel mode," meaning they have higher privileges and access to system resources than do "user mode" application process threads. While specific reference is made to Windows NT® concepts and terminology, those skilled in the art will recognize that many, if not most, operating systems share similarities relevant to the environment of the present invention.

Because there are different types of transport protocols developed over time by different entities for different reasons, there may be different types of transport protocol drivers acting as software components running on a single host computer system in order to provide the necessary networking capabilities for a given installation. Some common transport protocols include TCP/IP, IPX, AppleTalk®, and others. Each transport protocol driver will communicate with one or more individual network card device drivers in order to send network data over a communications network and receive incoming packets from the communications network.

Furthermore, because there are a multitude of network cards provided by numerous manufacturers, there are a corresponding large number of potential network card device drivers. In order to support full connectivity to the transport protocol drivers, each network card device driver must support the ability to communicate with each different type of transport protocol driver. Because of the complexity of many different variations that could conceivably be connected together due to the layered component approach, building such is drivers can be a time intensive process and the nature of the different inter-faces each driver must use is illustrated in FIG. 1.

Figure 1:
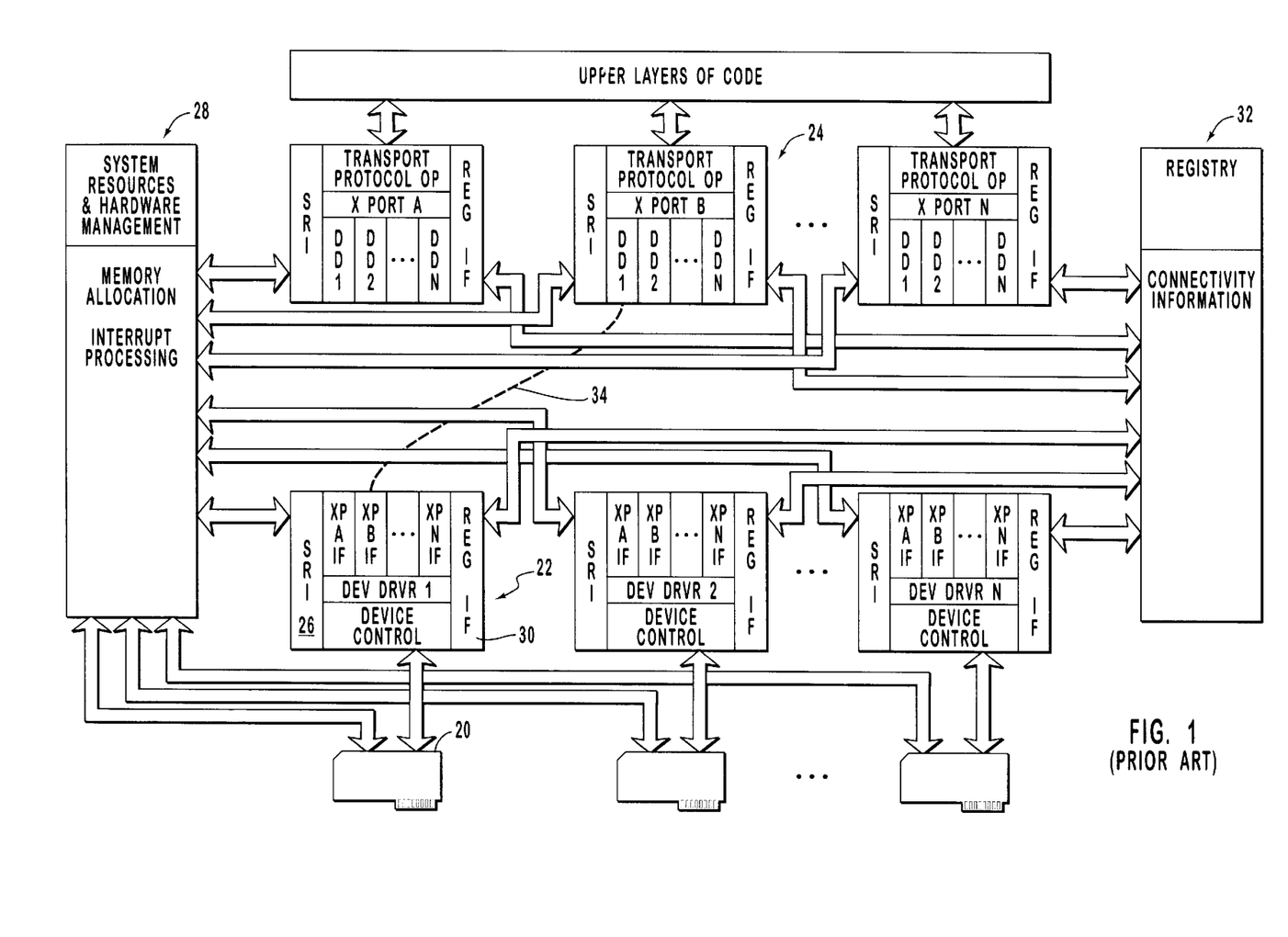
FIG. 1 is a block diagram showing the environment and interfacing of network card device drivers and transport protocol drivers as existing in the prior art.

FIG. 1 is a block diagram showing the structure of a plurality of network cards, network card device drivers, and transport protocol drivers that each must interact with system resources and a central database or registry having connectivity information in order to operate properly. Furthermore, each transport protocol driver must support each and every network card device driver for which it may be connected and in like manner each network card device driver must support communicating with each and every transport protocol driver to which it may be connected.

If a new transport protocol driver is introduced, each network card device driver wanting to support the new transport protocol driver may require modification to the source code followed by a re-release and distribution of the executable driver code. likewise, a new network card device driver may also require a similar re-release. Releasing and distributing software is an expensive process that software companies desire to limit as much as possible.

For example, passing network information arriving on network card 20 controlled by network card device driver 22 to the transport protocol driver 24 requires the transport protocol driver 24 and the network card device driver 22 to be fairly complex in terms of programming effort. This may take significant time for a developer or engineer to create. Note that the network card driver 22 must not only interact with the network interface card 20 but also have an interface 26 to the system resources 28 as well as an interface 30 to the registry 32 containing connectivity information. Through such interfaces and the programming entailed therein, the network card device driver 22 will receive an interrupt that a packet has been received or is available for receipt by having the system execute code in an interrupt handling routine previously registered that makes use of system resources such as RAM for storing the packet.

Furthermore, the network card device driver 22 will use the registry interface 30 to access the registry 32 connectivity information for determining which transport protocol driver(s) will receive the packetized network information. For purposes of this example, the transport driver 24 is the recipient as illustrated by connecting line 34. Note also that the network card device driver 22 must support or be able to communicate with other transport protocol drivers since a variety exist and it is not known at development time which transport protocol driver will be indicated in the control information found in the registry 32 for receiving the network data.

On the other hand, the protocol transport driver 24 must also interface with the system resources 28 and the registry 32 containing connectivity information. Again, in order to support the many available network card device drivers, each transport protocol driver will be a relatively complex software component since the precise network card device driver for interfacing is not known at the time of development.

Figure 2:
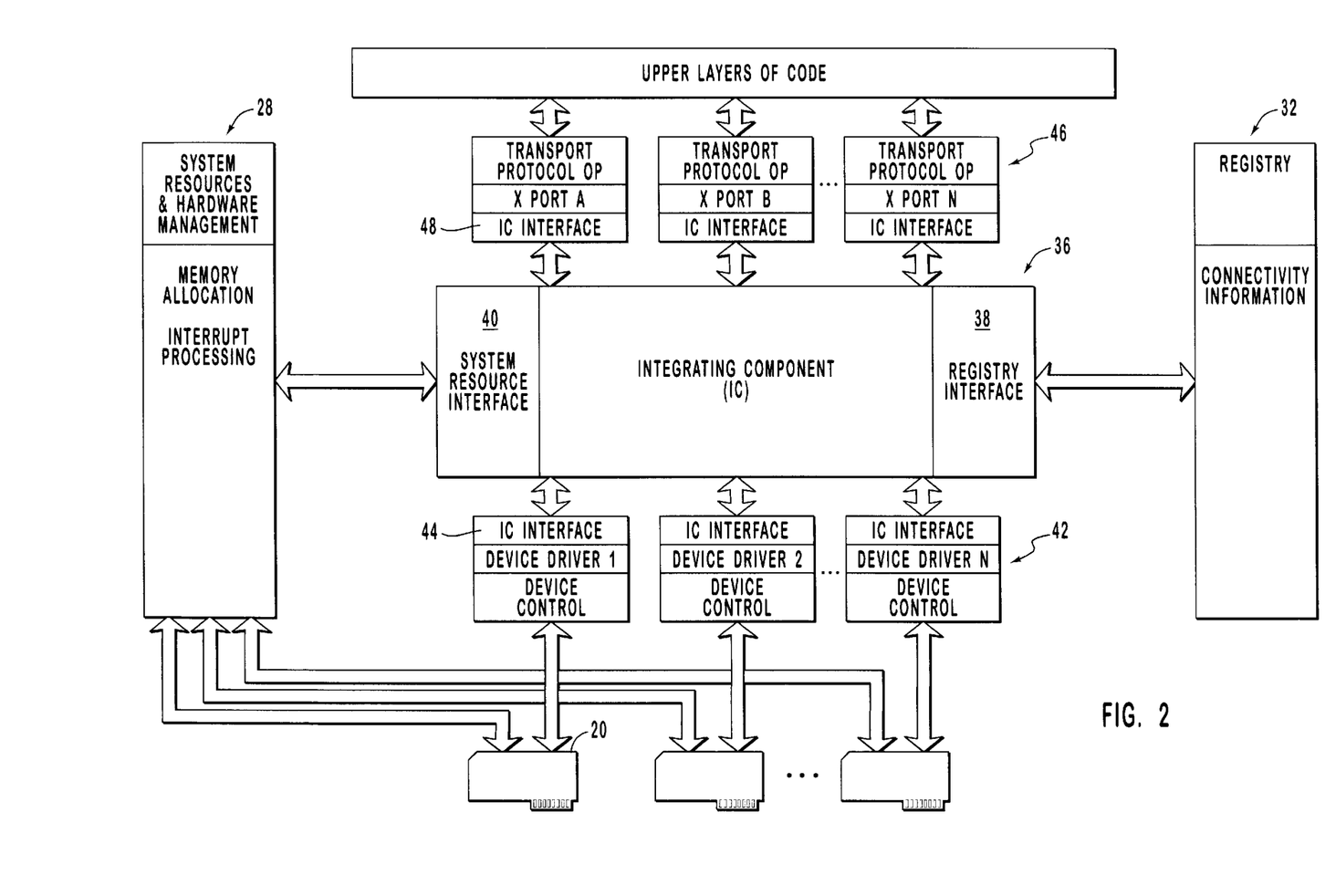
FIG. 2 is a block diagram showing the introduction of an integrating component that reduces the development complexity of network card device drivers and transport protocol drivers that constitutes the current environment of the present invention.

One advance in the art that has reduced the complexity associated with developing transport protocol drivers and network card device drivers is that of an integrating component that provides an abstracted interface to transport protocol drivers developers and to network card device driver developers. FIG. 2 is a block diagram showing the introduction of an integrating component that reduces the complexity of transport protocol driver development and network card device driver development. In such an environment, an integrating component 36 will have a registry interface 38 for accessing a registry 32 of connectivity information and a system resource interface 40 for accessing system resources 28. Therefore, development of the network card device driver 42 for controlling network card 20 is greatly simplified. The network card device driver 42 must only support an interface 44 to the integrating component 36. In like manner, the transport protocol driver 46 is also further simplified as only an interface 48 to the integrating component 36 may be supported.

The complexity of interfacing directly with the system resources 26 and the registry 32 of connectivity information is now handled by the integrating component 36. Furthermore, the integrating component provides an interface to developers incorporating many services and functionality that will be common to network card drivers and transport protocol drivers allowing the drivers to be developed more efficiently.

Another inherent benefit is that all routing of packets between transport protocol drivers and network card device drivers is managed by the integrating component. A particular transport protocol driver or network card device driver does not need to know the specific interface of the other components processing the same network packet. In other words, any network card device driver written to the integrating component 36 will be able to communicate with any available transport protocol that is also written to the integrating component 36 as determined by the connectivity information contained in the registry 32 and vice versa with respect to transport protocol drivers communicating with network card device drivers.

Besides providing quicker transport network card device driver development, the use of an integrating component 36 also facilitates multi-platform support. The integrating component interface may be supported on many different platforms, effectively encapsulating the details of actual interfacing with the a particular operating system and environment. A driver developer generally needs to write the driver only one time and simply recompile the driver on any system that has the integrating component 36 supported thereon.

One technology for integrating network card device drivers to transport protocol drivers is the Network Driver Interface Specification (NDIS) technology implemented on the is Windows NT® operating system as the NDIS wrapper device driver. The NDIS technology is also supported on other systems, such as the Windows95® operating system, in order to support cross platform support of network card device drivers and transport protocol drivers. The integration component manages all interaction with system level services and hardware to further reduce development complexity of connected drivers. For example, the NDIS wrapper manages initial interrupt processing, system memory allocations to connected drivers, allocation to other hardware resources, etc. as well as providing packet routing capability between network card device drivers and transport protocol drivers.

While many benefits accrue from the use of an integrating component, such as the NDIS wrapper, during the processing of network data, certain behaviors are introduced that impair system efficiency. One such problem occurs due to the nature of interrupt processing done to service the network card and the different execution levels of the host processing system inherent therein.

Normally, a host operating system, such as Windows NT®, operates at a normal or passive level wherein user processes and process threads execute on the host processor (or processors in a multi-processor system). Periodically, events occur that raise the execution level up to a "higher" level that preempts whatever is happening on the passive level. For example, a hardware interrupt will cause the system to begin executing code of an Interrupt Service Routine (ISR) at an execution level that is higher than passive level in order to service hardware.

In the Windows NT® operating system, execution levels, in general, are known as interrupt request levels or IRQLs and all hardware device interrupts have a level associated therewith known as a device interrupt request level or DIRQL. The highest level DIRQLs are reserved for critical operating system functions such as bus errors, system clock, etc. One form of general software interrupt runs at the Deferred Procedure Call (DPC) level which is above passive level but typically below the DIRQLs associated with hardware device interrupts. Examples of raised execution level processing includes receipt of network data from a communications network, context switching between process threads by the task manager so that another process or process thread may use the host CPU, etc.

Besides hardware interrupts, software interrupts may be scheduled by an ISR or other entity. Since interrupts of a lower level as well as other processing are masked when a host processor executes a particular ISR associated with a particular DIRQL, it is often important to end the high execution level associated with processing the hardware interrupt as soon as possible so that other waiting interrupts may be serviced. One common strategy is to have the ISR schedule a software interrupt to perform the bulk of processing to allow the ISR to be so written that it uses the least amount of host CPU time. In the Windows NT® environment, one form of general software interrupt processing code is referred to as a Deferred Procedure Call or DPC. A DPC is placed in a queue and runs at the dispatch level IRQL that will begin processing after all the DIRQLs have been cleared.

One problem associated with higher execution levels is that they do not allow safe access to certain system facilities. For example, a virtual memory manager's paged memory may only be accessed by threads running at the passive level in the NT operating system. The paged memory is not available to higher execution levels such as those associated with ISRs and DPCs. Therefore, network packets being received and processed in the DPC execution level, in many instances, cannot be fully processed before termination of the DPC level since paged memory is unavailable. To solve this problem, a transport protocol driver requires a portion of code running in the DPC level to copy the network data into a separate data structure for future processing by the transport protocol driver at the passive execution level. Copying the data into a separate data structure is required because there is no way to guarantee that the network data in the packet will not become overwritten once the DPC has finished execution. Since the network card device driver may immediately reuse the packet once the invocation session that initiated DPC level processing at the transport protocol driver is terminated, there is no guarantee that the data in the packet will be available once the transport protocol driver's DPC level code is exited.

Such data copying impacts system performance on a number of different levels. First, precious host CPU time is used to make the intra-system data copy from one buffer to another, second, excessive system memory resources are utilized in order to have the extra buffers for copying the data, third, system caches are excessively used by the copy operation impairing efficiency for other operations, and fourth, Translation lookahead Buffers (TLBs) are also excessively used impairing efficiency in address translation. It would be an advancement in the art to reduce intra-system copying so that more system memory is available for other uses and so that no CPU time is lost moving data from one location to another.

SUMMARY AND OBJECTS OF THE INVENTION

It is an object of the present invention to reduce intra-system data copying during processing of network data.

It is another object of the present invention to allow ownership of a packet to be temporarily transferred from one software component to another.

It is a further object of the present invention to provide a means for increasing host system processing efficiency by reducing the amount of resources required for processing network data.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and computer program product for reducing intra-system copying during network packet processing is provided. By reducing intra-system data copying, overall system performance is improved due to increased system efficiency.

The present invention reduces the intra-system copying during DPC explained previously by temporarily transferring "ownership" of the network packet from an originating software component to a destination software component. The originating software component is the owner of a particular packet data structure or packet used for holding network data that is received from a communications network. Any software component may be the owner of a particular packet by requesting an instance of the packet structure from the system or from an integrating component that abstracts all interaction with the system. Furthermore, the same packet format is used by other software components that may process or direct the network data from one component to another.

A packet is transferred from one software component to another with an indication that ownership may temporarily be granted. If the second component wishes to take temporary ownership, it will so indicate to the first component. Later, when the second component is finished processing, it will release temporary ownership of the packet thereby allowing the first component to use the packet at will.

One preferred embodiment of the present invention utilizes an integrating component that allows network card device drivers and transport protocol drivers to be flexibly connected. The integrating component also abstracts all interaction with the operating system, provides common services to the respective types of drivers, and may allow intermediary drivers to be connected for processing a packet in between a network card device driver and a protocol transport driver. Finally, the integrating component is the mechanism for transferring a packet between the various software components for processing.

In the preferred embodiment, the indication that temporary ownership transfer is given when a network card device driver calls a specific subroutine provided by the integrating component in an export library. The integrating component, in turn, calls a subroutine in the transport protocol driver that was made known to the integrating component during driver initialization that is used by the transport protocol driver to handle temporary packet ownership, if necessary. By making known the particular subroutine to the integrating component, the transport protocol driver is indicating the ability to handle temporary packet ownership.

If the transport protocol driver actually does take temporary ownership, it will return with a status code indicating such. The integrating component will also return a status code to the network card device driver indicating that temporary ownership has been taken by another software component.

A release of temporary ownership is indicated by the transport protocol driver making a subroutine call provided by the integrating component. The integrating component will then make a subroutine call to a release handler whose entry point was previously provided during network card device driver initialization.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings as described below.

DETAILED DESCRIPTION OF THE PREFERRED EMBODIMENTS

As used herein, the term "software component" refers to any set of executable instructions separately cognisable to an operating system that manages a computer system. Examples would include separate processes or threads, application programs, system device drivers, and any other such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another.

As used herein, the term "driver" refers to software driver programs running in a privileged system environment and that is interact with an I/O subsystem as part of an operating system architecture. Such drivers are distinguishable from application programs and other software.

As used herein, the term "direct call linkage" refers to a function call interface. The actual address resolution may be done at compile time through traditional linkers or may be done dynamically by system components when using such entities as dynamic link libraries or export libraries. An invocation session is created when a subroutine is initially called and ends when that particular subroutine ends. An Application Programming Interface (API) is a set of subroutines provided by one software component so that relevant services may be uniformly accessed.

Figure 3:
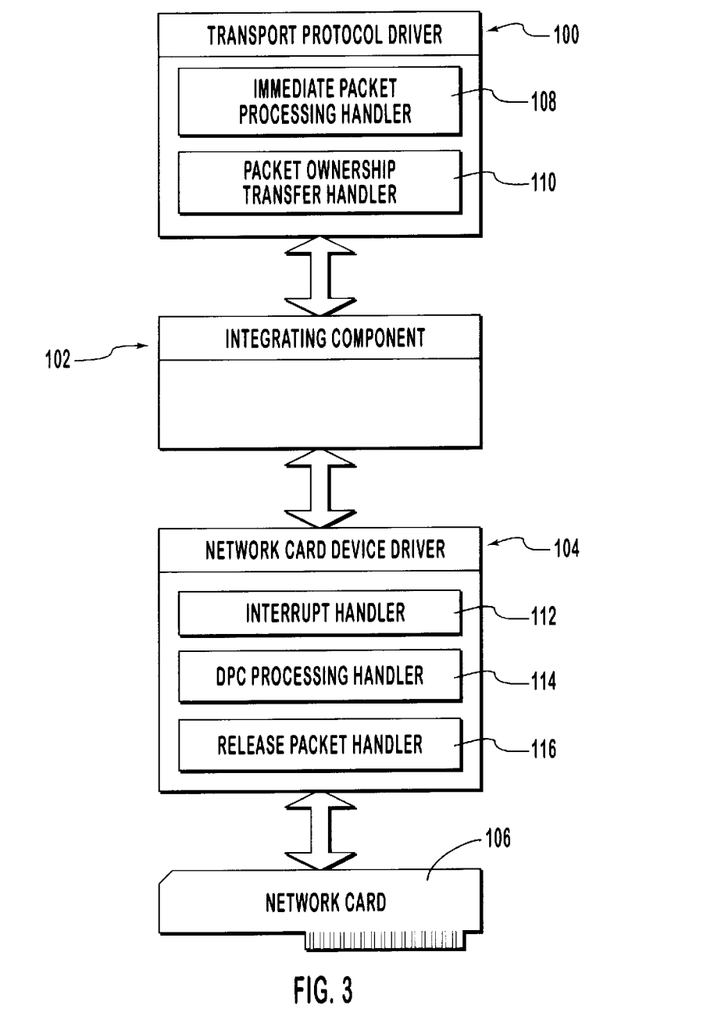
FIG. 3 is a block diagram showing the layered software approach and in particular illustrating that any communication between the transport protocol driver and the network card device driver is made through the integrating component. Further, different entry points or portions of the respective transport protocol driver and network card device driver are shown that are separately made known to the integrating component.

As used herein, the term "messaging" refers to sending uniform message blocks between software components in order to communicate therebetween. One example would be the I/O Request Packet (IRP) structure used in the Windows NT® I/O system to communicate between different drivers. Referring now to FIG. 3, a block diagram is shown presenting the inter relationship between the different components used in processing network data, namely a transport protocol driver 100, an integrating component 102, and a network card device driver 104. Collectively, the above mentioned software components operate with each other and the operating system to control the network card 106 in order to bring network data from a communications network into the host system for processing.

Within transport protocol driver 100 are two separate entry points for processing packet information, namely, an immediate packet processing handler 108 and a packet ownership transfer handler 110. The entry points for the immediate packet processing handler 108 and the packet ownership transfer handler 110 are made known to the integrating component 102 during system initialization. In this manner, the integrating component 102 may directly call these portions of code during the due course of processing.

The processing of an incoming packet using the immediate packet processing handler 108 will require a data copy by the transport protocol driver 100 as will be shown hereafter. Using the packet ownership transfer handler 110 will allow processing of the network data to occur without making a system copy according to the present invention. The integrating component 102 will select which of the two entry points into transport protocol driver 100 is taken based on predetermined criteria giving preference to transferring packet ownership in order to reduce the intra-system copy of network data.

Should legacy transport protocol drivers be attached to the integrating component 102, they will present only one entry point, namely, the immediate packet processing handler 108 to implicitly indicate to the integrating component 102 that they are not capable of handling a transfer of packet ownership. Criteria such as the number of packets outstanding for the network card device driver 104 are used to determine whether or not the immediate packet processing handler 108 or the packet ownership transfer handler 110 is used. For example, a fixed number of packets may be used by the network card device driver 104 for bringing in network data onto the system. Since data may be arriving continuously, the network card device driver 104 must be assured of having a certain amount of buffer memory immediately available in order to avoid losing or "dropping" the packet coming over the communications network. Therefore, if either the integrating component 102 or the network card device driver 104 determines that it would be unwise to release ownership of a packet, the appropriate entry point in the transport protocol driver 100 will be chosen, namely, the immediate packet processing handler 108 even though the packet ownership transfer handler 110 is available. Therefore, two conditions must occur before actual packet ownership transfer may occur: the transport protocol driver 100 must support the ability to take ownership of a network packet, and it must be appropriate for the network card driver 104 to temporarily release ownership of the packet. Regardless of which packet processing handler is ultimately used, they will run at the DPC level as will be explained hereafter in connection with FIGS. 6A and 6B.

The network card device driver 104 has three separate entry points shown, namely, an interrupt handler 112, a DPC processing handler 114, and a release packet handler 116. These different handlers are registered or otherwise made known to the integrating component 102 so that they may be directly called by the integrating component 102 when particular events occur as will be explained hereafter.

Figure 4:
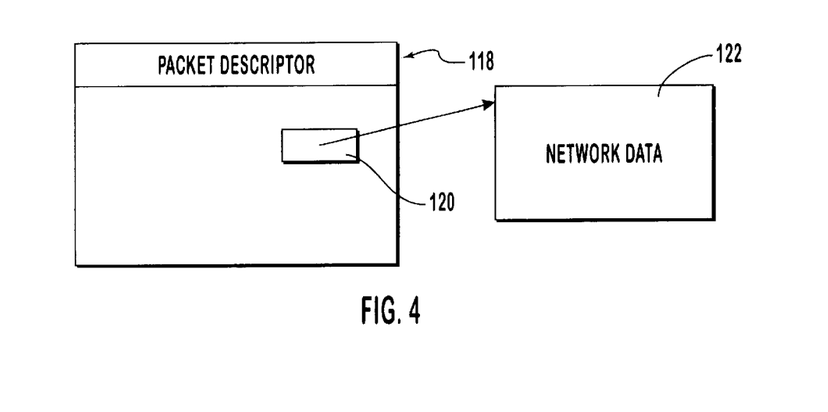
FIG. 4 is a block diagram of a packet showing a packet descriptor and associated network data found in a buffer that is originally allocated by a request to the integrating component by a driver interfaced thereto and is a common format used by the network card device driver and the transport protocol driver.

Referring now to FIG. 4, one type of packet structure for holding network data is shown. One currently preferred embodiment of the present invention utilizes the packet structure of FIG. 4 for both transport protocol drivers and network drive device drivers. A packet descriptor 118 contains information about the network data such as time of receipt or transfer, references to associated control information, etc. Importantly, a pointer 120 references a buffer 122 containing the actual network data. Note that the buffer 122 may be organized as a set of Memory Descriptor Lists (MDLs) as implemented in the current embodiment or in other forms of virtual or physical memory.

Figure 5:
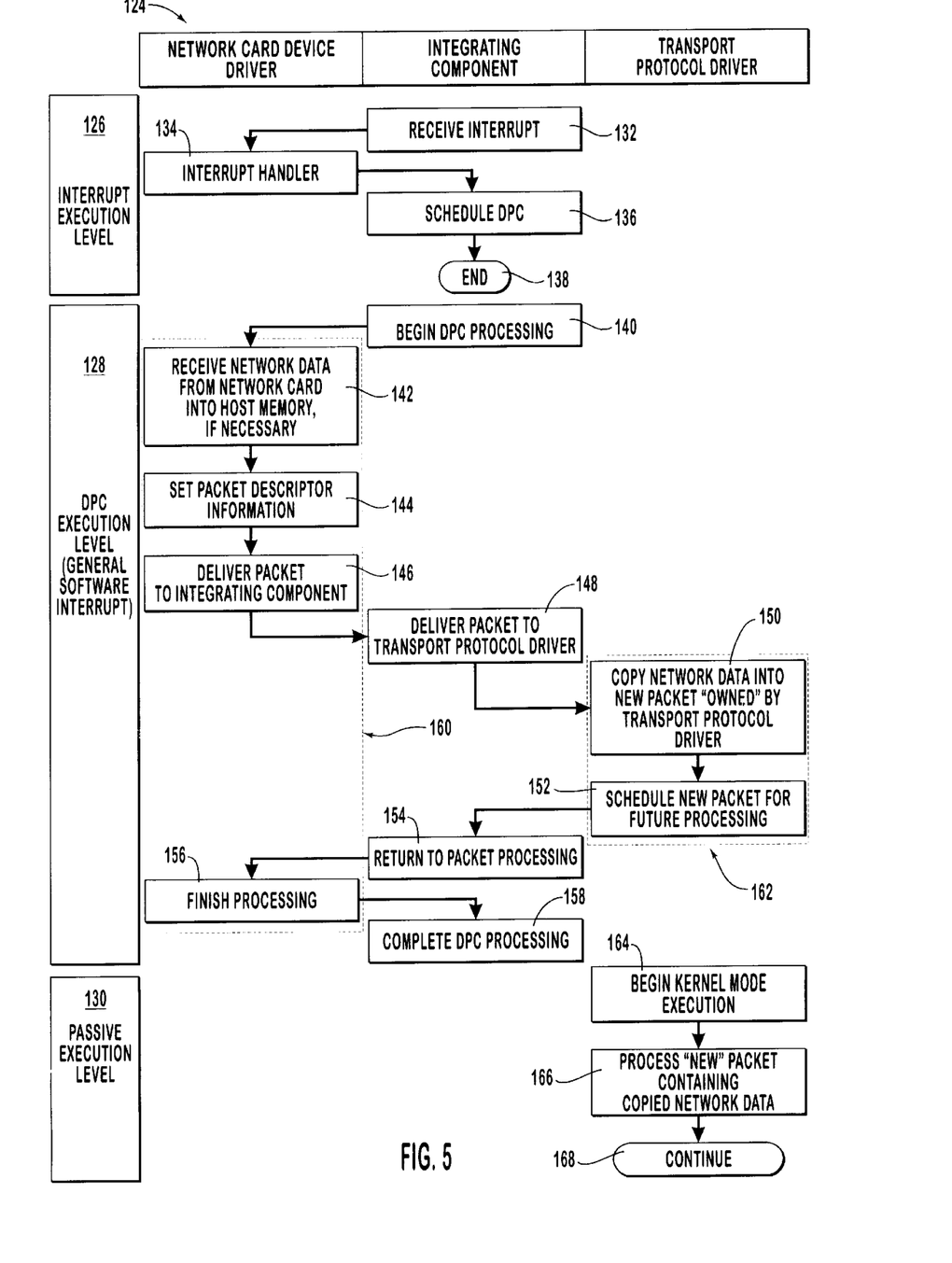
FIG. 5 is a flow chart showing the processing of incoming network data wherein packet ownership is retained by the network card device driver and shows the three different execution levels where processing takes place.

Referring now to FIG. 5, a flow chart is shown illustrating the processing of incoming network data at three different host system execution levels in a situation when either the transport protocol driver 100 does not support the transport of packet ownership or when it would be inadvisable because of scarcity of packet availability or otherwise to transfer ownership.

At the top of FIG. 5 is a bar 124 showing which of the particular software components, namely, network card device driver 104, the integrating component 102, or the transport protocol driver 100 will actually be executing the steps indicated below the captions. The bars on the left indicate the different processor execution level pertinent to the particular processing steps. The execution levels from highest to lowest are the interrupt execution level 126, the DPC execution level 128, and the passive execution level 130. Processing at each execution level will be finished before processing begins at the next lower execution level begins due to the inherent nature of execution level processing, therefore, each step may be viewed as happening sequentially across the different execution levels.

It is presumed that prior to processing as shown in FIG. 5, the network card device driver 104 and the transport protocol driver 100 have made requests to the integrating component 102 in order to receive a number of packet descriptors and buffer memory for their particular use. While such allocations may occur at any time, it is preferred to have an existing set of buffers and descriptors available for use.

When the network card 106 receives indication of data being ready or available from the communications network, the card will raise an interrupt that is initially handled by the host computer operating system. At a certain point, the integrating component 102 receives processing control due to the interrupt and begins processing at step 132. Eventually, the integrating component 102 will call the interrupt handler 112, the entry point previously provided by the network card device driver 104, wherein specific hardware interrupt handling occurs at step 134. In order to allow other device hardware interrupts access to the host processor, the minimum amount of processing is done during the interrupt handling in step 134 before returning control back to the integrating component 102.

The integrating component 102 schedules a DPC at step 136 wherein the bulk of incoming packet processing will occur. A DPC on the Windows NT® operating system runs on a system execution level corresponding to a general software interrupt and will therefore preempt all process thread operations while still allowing hardware interrupts to be taken without delay. After scheduling the DPC, the integrating component 102 will end interrupt processing at step 138 causing the system to take up operations at the point prior to receiving the interrupt.

The host system will begin processing the DPC after all higher execution level operations are completed (i.e., DIRQLs) and pass control to the integrating component 102 where DPC processing begins at step 140. As part of the DPC processing, the integrating component 102 will call the entry point for the DPC processing handler 114 and network data will be received from the network card 106 into buffer memory at step 142, if necessary, depending on the network card 106 hardware. The more efficient nature of modern network hardware typically brings data straight from a communications network into the host system memory buffer prior to raising the interrupt since the network card itself is a busmaster and the actual locations of host memory have been previously loaded into the network card 106.

Next, at step 144 the packet descriptor information, including a reference to the location of the network data, is set. Note that both the packet descriptors and the host system buffers for receiving network data were previously allocated to the network card device driver 104 by the integrating component 102 as a result of a previous request. Once the packet is completed, it is sent to the integrating component 102 at step 146 by means of a direct call linkage. A direct subroutine call transfers control quickly; though other forms of control transfer, such as messaging could be used to transfer execution control between software components.

At this point, the integrating component 102 assumes control of operations and as part of processing, will send the packet to the designated transport protocol driver at step 148. The integrating component 102 will be able to resolve correct destination for the packet by virtue of a "handle" representing a connection used in interactions between the integrating component 102 and the respective drivers. The handle is created based on the connectivity information previously accessed during initialization of the network card device driver 104 and the transport protocol driver 100.

The transport protocol driver 100 receives processing control and attempts to completely process the network data prior to exiting back to the integrating component 102. If a situation results wherein immediate packet processing may not be completed, the network data is copied into a packet owned by the transport protocol driver 100 at step 150 in order to guarantee that the data will remain uncorrupted. As explained previously, once control passes back to the network card device driver 104, it is free to operate on the packet as appropriate and may therefore change the data in the buffer before processing can be completed by the transport protocol driver 100 at the passive execution level.

Finally, the new packet owned by the transport protocol driver 100 is queued up in some form for future processing at step 152. This processing will occur at the passive execution level and will not begin until all DPC processing for the system is completely finished. Note that if complete processing of the network data occurs, there is no need to copy the network data into a new packet. However, most network packet processing does require more processing than may occur at the DPC execution level alone since eventual access is required to passive level services such as paged memory.

Control is then returned back to the integrating component 102 and as part of continued processing will return back to the network card device driver 104 at step 154. This occurs in response to the subroutine previously called. The integrating component 102 subroutines used by the respective drivers are provided by the integrating component 102 in an export library and linked, in this case, by the network card device driver 104 in order deliver the packet. The network card device driver 104 will finish any necessary processing in step 156 before returning back to the integrating component which will in turn complete the DPC processing at step 158. Upon completion of DPC handling for the network card device driver, the host system will process any other DPCs before allowing normal process thread operations to continue executing at the passive execution level.

Note that the steps enclosed by box 160 correspond to the DPC processing handler 114 that are provided by the network card driver 104 to the integrating component 102 during initialization. In like manner, the processing steps enclosed in box 162 correspond to the immediate packet processing handler 108 of the transport protocol driver 100 whose entry point was provided previously.

After processing all DPCs, passive level operations may resume operation and the particular process thread for the transport protocol driver 100 will in turn continue processing the network data as contained in the new packet containing copied network data. This is shown by the process thread at some point entering kernel mode execution at step 164 wherein it will access and process the new packet containing the copied network data at step 166. Such processing may access paged memory or other resources and operations that could not be achieved at the DPC level which initially necessitated the copy of the network data. Finally, the execution of a transport protocol driver 100 continues at step 168 according to its normal course of operations.

Figure 6A:
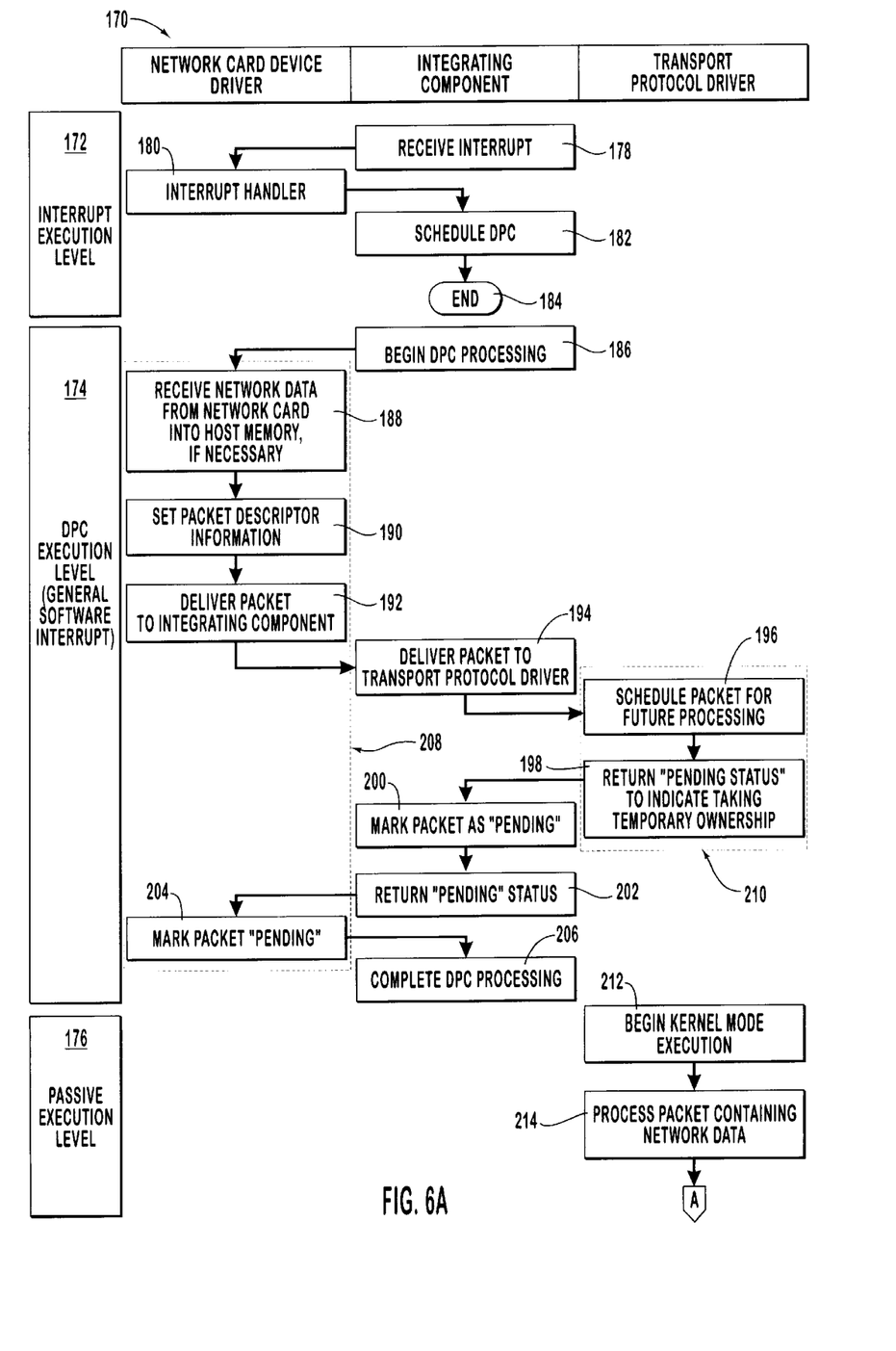
FIGS. 6A and 6B are a flow chart showing the processing of incoming network data wherein packet ownership is transferred from the network card device driver to the transport protocol driver to thereby obviate a need for copying the network data from one buffer to another.
Figure 6B:
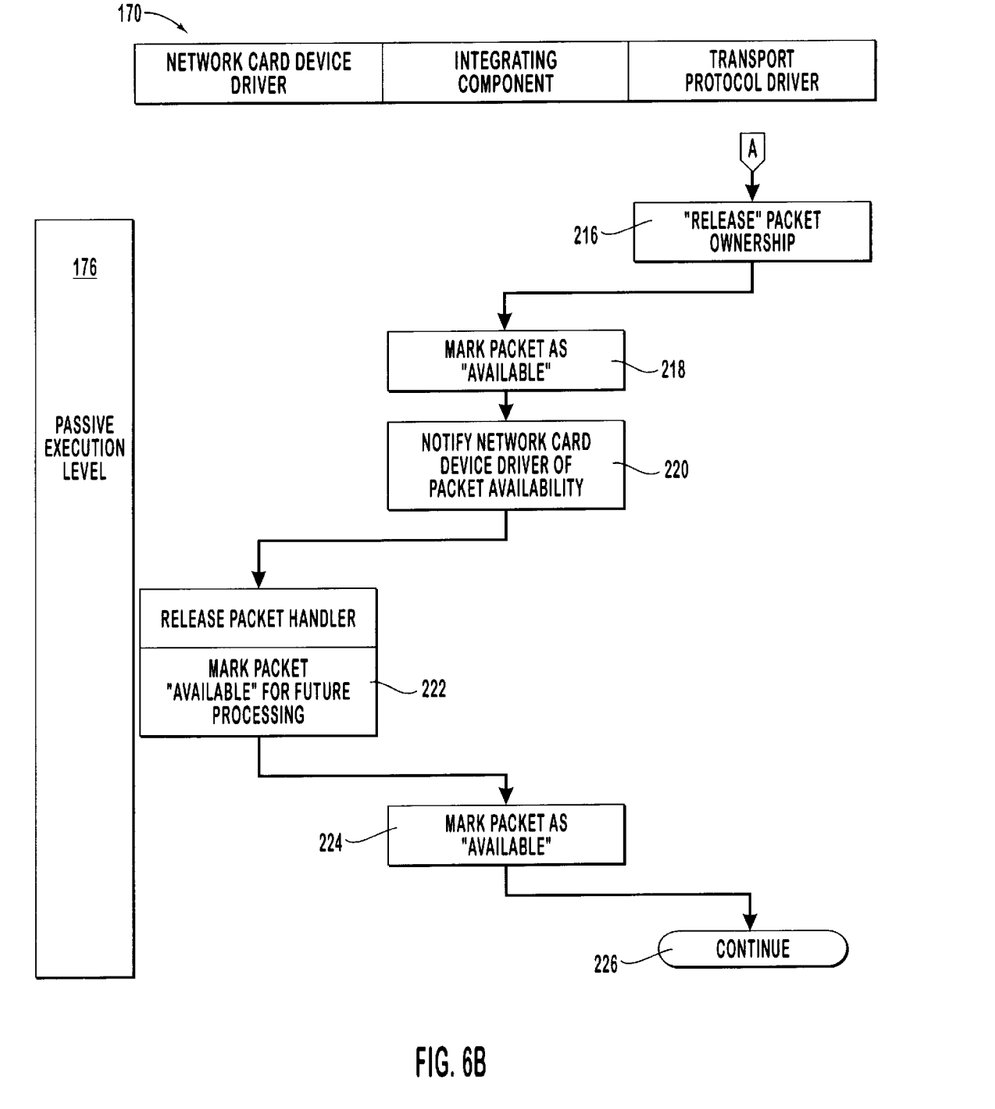

Referring to FIGS. 6A and 6B, a flow chart is shown illustrating processing steps through the three host processor execution levels and different software components similar to the flow chart of FIG. 5 except that packet ownership is transferred to the transport protocol driver 100 and is temporarily unavailable for use by the network card device driver 104. Again, a bar 170 above the processing steps indicates which software component is executing a particular step while the boxes to the right of the processing steps indicate the different execution levels. The execution levels are specifically the interrupt execution level 72, DPC execution level 174, and the passive execution level 176 as explained previously in connection with FIG. 5.

When the network card 106 receives indication of data being ready or available from the communications network, the card will raise an interrupt that is initially handled by the host computer operating system. At a certain point, the integrating component 102 receives processing control due to the interrupt and begins processing at step 178. Eventually, the integrating component 102 will call the interrupt handler 112, the entry point previously provided by the network card device driver 104, wherein specific hardware interrupt handling occurs at step 180. In order to allow other device hardware interrupts access to the host processor, the minimum amount of processing is done during the interrupt handling in step 180 before returning control back to the integrating component 102.

The integrating component 102 schedules a DPC at step 182 wherein the bulk of incoming packet processing will occur. As previously explained, a DPC on the Windows NT® operating system runs on a system execution level corresponding to a general software interrupt and will therefore preempt all process thread operations while still allowing hardware interrupts to be taken without delay. After scheduling the DPC, the integrating component 102 will end interrupt processing at step 184 causing the system to take up operations at the point prior to receiving the interrupt.

The host system will begin processing the DPC after all higher execution level operations are completed (i.e., DIRQLs) and pass control to the integrating component 102 where DPC processing begins at step 186. As part of the DPC processing, the integrating component 102 will call the entry point for the DPC processing handler 114 and network data will be received from the network card 106 into buffer memory at step 188, if necessary, depending on the network card 106 hardware. As previously explained in conjunction with FIG. 5, the more efficient nature of modern network hardware typically brings data straight from a communications network into the host system memory buffer prior to raising the interrupt since the network card itself is a busmaster and the actual locations of host memory have been previously loaded into the network card 106.

Next, at step 190 the packet descriptor information, including a reference to the location of the network data, is set. Note that both the packet descriptors and the host system buffers for receiving network data were previously allocated to the network card device driver 104 by the integrating component 102 as a result of a previous request. Up to this point, processing has proceeded substantially equivalent to that done with respect to immediate packet processing explained in connection with FIG. 5.

Once the packet is ready for transfer to the appropriate transport protocol driver 100 the network card device driver 104 will, as part of DPC handling in the DPC handler 114, make a call to the integrating component 102 indicating that it will allow the transfer of packet ownership at step 192. This may be done by calling a particular subroutine provided by the integrating component 102 that is different from immediate packet processing subroutine. This is the approach taken by one preferred embodiment so that previous network card device drivers that are incapable of allowing packet ownership transfer will continue to function normally. Other ways exist for the network card device driver to indicate a willingness to temporarily transfer ownership as will be appreciated by those skilled in the art. For example, a single interface subroutine call that has flags or other mechanisms for indicating the allowability of packet ownership transfer may be used.

One situation where a network card device driver may not transfer packet ownership occurs when a driver is managing a fixed number of packets. As a large number of the packets become busy by being used or marked as 'pending' (explained in greater detail below), the risk of not being able to service network data available on a communications network increases. The network card device driver may then force immediate processing so that a packet may be quickly reused so as to not lose network data destined for the host system.

When the integrating component 102 receives control, it will in turn transfer to the transport protocol driver 100 at step 194 by calling an entry point within the transport protocol driver 100 corresponding to the packet ownership transfer handler 110. Note that even though a network card device driver 102 indicates allowability for packet ownership transfer and the integrating component 102 would otherwise call the packet ownership transfer handler 110, the transport protocol driver 100 may not support such ownership transfer. If temporary ownership transfer is not supported, the transport protocol driver 100 will not make known a packet ownership transfer handler 110 but only an immediate packet processing handler 108. The integrating component 102 will have access to such information and will make the appropriate call as necessary. Furthermore, even though packet ownership transfer is allowed, the transport protocol driver 100 may complete processing and have no need to take ownership of the packet beyond the invocation session. If this is the case, an appropriate status code will be returned back to the integrating component at the end of the transport protocol driver 100 during DPC processing.

At step 196, the transport protocol driver 100, during the course of processing, will determine that the packet requires additional processing at a lower execution level and schedule the packet for future processing. At this point, the transport protocol driver 100 will return a 'pending' status code to the integrating component 102, at step 198, to indicate that temporary packet ownership has been taken by the transport protocol driver 100 and that a release of packet ownership will occur at a later time. The integrating component 102 will then mark the packet as 'pending' (as opposed to 'available') at step 200 and return a 'pending' status back to the network card device driver 104 at step 202. It may be noted that some implementations may not require the integrating component 102 to track the particular status of a packet, leaving such responsibility entirely to the network card device driver 100.

Should the network card device driver 104 be managing the status of its packets, it will also mark the packet as 'pending' at step 204. Note that the processing flow of FIGS. 6A and 6B has both the integrating component 102 and the network card device driver 104 containing status information for a particular packet. It will be understood by those skilled in the art that implementations may be made where only the integrating component 102 or the network card device driver 104 manages or tracks packet status information. Finally, the integrating component 102 will complete any residual DPC processing at step 206 before turning control back to the operating system. At this point, passive execution level processing will occur once any other higher system execution level events are processed.

Note that the steps enclosed by box 208 correspond to the DPC processing handler 114 that is provided by the network card driver 104 to the integrating component 102 during initialization. In like manner, the processing steps enclosed in box 210 correspond to the packet ownership transfer handler 110 of the transport protocol driver 100 whose entry point was provided previously.

A process thread that will eventually handle the network data contained in the packet now temporarily owned by the transport protocol driver 100. This process thread will at some point enter kernel mode execution in step 212 and be executing in the transport protocol driver code. At step 214, the temporarily owned packet will be processed as necessary having full access to passive execution level system resources, such as page memory. Finally, the transport protocol driver 100 will release packet ownership back to the network card driver 104 through the integrating component 102 by making a subroutine call to explicitly release temporary packet ownership at step 216.

The integrating component 102 will mark the packet as 'available' at step 218 and notify the network card device driver 104 of the packets availability for use at step 220 by calling the release packet handler 116. Until the network card device driver 104 is made aware that the packet is available for use, it will not use it since the status is marked as 'pending.' The network card device driver 104 will begin executing the release packet handler 116 that was previously registered with the integrating component 102 and do whatever processing is necessary for making the packet available for normal operations including marking the packet as 'available' at step 222. On termination, control will return to the integrating component 102 which will in turn return from the specific subroutine called by the transport protocol driver 100 to release the packet at step 224. At this point, the transport protocol driver 100 will continue processing at step 226 having returned ownership of the packet back to the network card device driver 104.

Those skilled in the art will recognize that the methods of the present invention may be incorporated as computer instructions stored as a computer program code means on a computer readable medium such as a magnetic disk, CD-ROM, and other media common in the art or that may yet be developed. Also, computer componentry such as RAM, ROM, EEPROM, etc. may serve as a source of program code means storage or computer readable medium. Combinations of computer readable medium are also contemplated within the scope of this invention. Program code means comprises, for example, executable instructions and data which cause a general purpose or special purpose computer to perform a specific function or functions. Such embodiments of the present invention stored on a computer readable medium constitute an article of manufacture. Additionally, important data structures found in computer hardware memory may be created due to operation of such computer program code means.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In an environment having an integrating software component interfacing between transport protocol drivers and network card device drivers, the integrating software component allocating and managing data structures for use by the respective transport protocol drivers and network card device drivers, a method for temporarily transferring data structure ownership from a network card device driver to a transport protocol driver, wherein the method comprises the following:

a specific act of the network card device driver causing the integrating software component to create a data structure, and the network card device driver populating the data structure with information;

a specific act of sending the data structure to the transport protocol driver;

a specific act of the transport protocol driver receiving the data structure and indicating a transfer of ownership of the data structure to the integrating software component; and a specific act of temporarily making the data structure unavailable to the network card device driver.

2. A method as recited in claim 1 further comprising the specific acts of:

the transport protocol driver indicating a release of ownership of the data structure to the integrating software component after processing the information contained therein; and making the data structure available to the network card device driver.

3. A method as recited in claim 1 further wherein the integrating component centrally manages availability of the data structure for the network card device driver.

4. A method as recited in claim 1 further wherein the network card device driver manages availability of the data structure.

5. A method as recited in claim 1 wherein the the network card device driver, the transport protocol driver, and integrating software components are system device drivers.

6. A method as recited in claim 1 wherein the creation of the data structure is accomplished by a direct call linkage between the network card device driver and the integrating software component and the sending of the data structure from the network card device driver to the transport protocol driver is accomplished by a direct call linkage between the network card device driver and the integrating software component followed by a direct call linkage between the integrating software component and the transport protocol driver.

7. A method as recited in claim 1 wherein the creation of the data structure is accomplished by messaging between the network card device driver and the integrating driver and the sending of the data structure from the network card device driver to the transport protocol driver is accomplished by messaging between the network card device driver and the integrating driver followed by messaging between the integrating driver and the transport protocol driver.

8. A method as recited in claim 1 wherein the integrating software component manages multiple data structures for the network card device driver and selectively signals data structure ownership transfer capability to the transport protocol driver based on availability of data structures for use by the network card device driver.

9. A method as recited in claim 1 wherein the data structure is a packet for holding network data.

10. A method as recited in claim 1 wherein the integrating software component is a driver that allows interconnection of transport protocol drivers and network card device drivers through defined APIs.

11. A computer-readable medium having computer-executable instructions for performing the specific acts recited in claim 1.

12. A method as recited in claim 1, wherein the data structures comprise network data packets wherein the method further comprises the steps of:
the network card device driver tracking ownership of the created network data packet;
the transport protocol driver indicating to the integrating software component the capability of temporary packet ownership transfer;
the network card device driver temporarily making the network data packet unavailable in response to an indication that temporary ownership has been taken by the transport protocol driver;
the network card device driver making the network data packet available once again an indication that temporary ownership has been released by the transport protocol driver.

13. A method as recited in claim 12 wherein the transport protocol driver indicates the capability of temporary packet ownership transfer by making a specific subroutine known to the integrating software component.

14. A method as recited in claim 12 wherein the indication that temporary ownership has been taken by the transport protocol driver comprises a status code indicating that the transport protocol driver has temporary ownership until released at a later time.

15. A computer-readable medium having computer-executable instructions for performing the steps recited in claim 12.

16. A method as recited in claim 1, wherein the data structures comprise network data packets wherein the method further comprises the steps of:
the integrating software component tracking ownership of the created network data packet;
the transport protocol driver indicating to the integrating software component the capability of temporary packet ownership transfer;
the integrating software component temporarily making the network data packet unavailable to the network card device driver in response to an indication that temporary ownership has been taken by the transport protocol driver;
the integrating software component making the network data packet available once again to the network card device driver for further use in response to an indication that temporary ownership has been released by the transport protocol driver.

17. A method as recited in claim 16 wherein the transport protocol driver indicates the capability of temporary packet ownership transfer by making a specific subroutine known to the integrating software component.

18. A method as recited in claim 16 wherein the indication that temporary ownership has been taken by the transport protocol driver comprises returning a status code indicating that the transport protocol driver has temporary ownership until released at a later time.

19. A computer-readable medium having computer-executable instructions for performing the steps recited in claim 16.

20. In an integrating software component that provides abstracted services and interconnections for a plurality of transport protocol drivers and a plurality of network card device drivers, a method for selectively and temporarily transferring packet ownership from a network card device driver to a transport protocol driver comprising the steps of:
ascertaining the capability of a transport protocol driver for taking temporary packet ownership;
receiving from the network card device driver a packet for delivery to the transport protocol driver with an indication of whether temporary packet ownership transfer is acceptable;
determining for the packet whether temporary packet ownership is advisable based on predetermined criteria;
delivering the packet to the transport protocol driver for processing and potential temporary packet ownership transfer only if the transport protocol driver is capable of taking temporary packet ownership and temporary packet ownership is acceptable and advisable; and
waiting for acknowledgement from the transport protocol driver whether temporary packet ownership was taken.

21. A method as recited in claim 20 wherein the indication of temporary packet ownership transfer acceptability is made by having the network card device driver call a specific subroutine provided by the integrating software component, temporary ownership if necessary.

22. A method as recited in claim 21 wherein the ascertainment of transport protocol driver capability for taking temporary packet ownership is made by having the transport protocol driver register a specific subroutine for processing packets that may take temporary ownership of necessary.

23. A computer-readable medium having computer-executable instructions for performing the steps recited in claim 20.

24. In an integrating software component that provides abstracted services and interconnections for a plurality of transport protocol drivers and a plurality of network card device drivers, a method for transferring packet ownership from a network card device driver to a transport protocol driver comprising the steps of:

receiving from the network card device driver a packet for delivery to the transport protocol driver;

delivering the packet to the transport protocol driver for processing and potential temporary ownership transfer; and waiting for acknowledgement from the network card device driver whether temporary packet ownership was taken.

25. A method as recited in claim 24 wherein the packet is received from the network card device driver with an indication of whether temporary packet ownership transfer is acceptable and the packet is delivered to the transport protocol driver only if temporary packet ownership is acceptable.

26. A method as recited in claim 25 wherein the indication of temporary packet ownership transfer acceptability is made by having the network card device driver call a specific subroutine provided by the integrating software component.

27. A method as recited in claim 24 further comprising the step of ascertaining the capability of a transport protocol driver for taking temporary packet ownership and the packet is delivered to the transport protocol driver only if the transport protocol driver is capable of taking temporary packet ownership.

28. A method as recited in claim 27 wherein the ascertainment of transport protocol driver capability for taking temporary packet ownership is made by having the transport protocol driver register a specific subroutine for processing packets that may take temporary ownership if necessary.

29. A method as recited in claim 24 further comprising the step of determining for the packet whether temporary packet ownership is advisable based on predetermined criteria and the packet is delivered to the transport protocol driver only if temporary packet ownership is advisable.

30. A computer-readable medium having computer-executable instructions for performing the steps recited in claim 24.

* * * * *

UNITED STATES PATENT AND TRADEMARK OFFICE
CERTIFICATE OF CORRECTION

PATENT NO. : 6,081,846
DATED : June 27, 2000
INVENTOR(S) : Jameel Hyder; Kyle Brandon; NK Srinivas; Rod Gamache It is certified that error appears in the above-identified patent and that said Letters Patent are hereby corrected as shown below:

Col. 2, ln. 34: after "such" and before "driver" delete [is]

Col. 2, ln. 35: after "different" change "inter-faces" to --interfaces--

Col. 4, ln. 4: after "the" and before "particular" delete [a]

Col. 4, ln. 12: after "the" and before "Windows" delete [is]

Col. 11, ln. 8: after "order" and before "deliver" insert --to--

Col. 14, ln. 32: after "as" change "illustrated" to --illustrative--

Col. 16, ln. 16: after "driver;" insert --and--

UNITED STATES PATENT AND TRADEMARK OFFICE
CERTIFICATE OF CORRECTION

PATENT NO. : 6,081,846

DATED : June 27, 2000

INVENTOR(S) : Jameel Hyder, et al.

It is certified that error appears in the above-identified patent and that said Letters Patent is hereby corrected as shown below:

Col. 16, ln. 59: after "component" delete [temporary ownership if necessary]

Col. 16, ln. 60: after "claim" change "21" to --21--

Signed and Sealed this

Eighth Day of May, 2001

Attest:

NICHOLAS P. GODICI

Attesting Officer

Acting Director of the United States Patent and Trademark Office